United States Patent [19]

Benthin et al.

[11] Patent Number: 5,790,595
[45] Date of Patent: Aug. 4, 1998

[54] METHOD FOR OBTAINING BIT-SPECIFIC RELIABILITY INFORMATION

[75] Inventors: Marcus Benthin, Hilderheim; Karl-Dirk Kammeyer, Buchholz, both of Germany

[73] Assignee: Robert Bosch GmbH, Stuttgart, Germany

[21] Appl. No.: 523,699

[22] Filed: Sep. 5, 1995

[30] Foreign Application Priority Data

Sep. 2, 1994 [DE] Germany .......................... 44 31 237.7

[51] Int. Cl.$^6$ .................................................. H04B 00/00
[52] U.S. Cl. .......................... 375/224; 375/227; 375/285; 371/6; 371/43
[58] Field of Search ........................... 375/224, 226, 375/227, 254, 278, 284, 285, 324, 341, 340; 371/6, 43

[56] References Cited

U.S. PATENT DOCUMENTS

| | | | |
|---|---|---|---|
| 4,224,689 | 9/1980 | Sundberg | 371/6 |
| 5,119,400 | 6/1992 | Koch | 371/43 |
| 5,222,101 | 6/1993 | Ariyavisitakul et al. | 375/231 |
| 5,333,150 | 7/1994 | Ketterling | 375/324 |
| 5,335,250 | 8/1994 | Dent et al. | 375/224 |
| 5,414,738 | 5/1995 | Bienz | 375/341 |
| 5,432,821 | 7/1995 | Polydoros et al. | 375/340 |
| 5,537,444 | 7/1996 | Nill et al. | 375/341 |

FOREIGN PATENT DOCUMENTS

| | | |
|---|---|---|
| 39 10 739 A | 10/1990 | Germany . |
| 42 24 214 A | 1/1994 | Germany . |
| 2 185 367 A | 7/1987 | United Kingdom . |

OTHER PUBLICATIONS

Vardy, A. et al: "Bit Level Soft Decision Decoding of Reed-Solomon Codes", Proceedings of the 16th IEEE Conference of Electrical and Electronics Engineers in Israel, 7-9 Mar. 1989, New York, US.

Bahl, L. R. et al, "Optimal Decoding of Linear Codes For Minimizing Symbol Error Rate", Transcactions on Information Theory, Bd IT-20, Nr. 2, Mar. 1974, New York, US.

Woerz T et al.: "Iterative Decoding For Multilevel Codes Using Reliability Information", Globecom '92, Communication For Global Users, Bd. 3 of 3, 6–9 Dec. 1992, New York, US.

Kazuhiko Yamaguchi.: "A Soft Decision Viterbi Decoding Method Using Received Carrier Level In Fading Channel", Electronics & Communications in Japan, Part I—Communications, Bd. 73, Nr. 2, 1 Feb. 1990, New York, US.

Hagenauer, J.: "Viterbi decoding of convolutional codes for fading—and burst–channels", 1980 International Zürich Seminar On Digital Communications, 4–6 Mar. 1980, New York, US.

(List continued on next page.)

*Primary Examiner*—Wellington Chin
*Assistant Examiner*—Congvan Tran
*Attorney, Agent, or Firm*—Kenyon & Kenyon

[57] ABSTRACT

In a method for demodulation of multistage-modulated data, correspondence variables (decision variables) are determined from the comparison of the received signal with stored signals, and these correspondence variables are converted into a posteriori symbol probabilities. The received signal represents a symbol which in turn represents a data group. The a posteriori symbol probabilities are now accounted for in turn such that one individual probability information item is produced for each bit of a data group, which information indicates the probability of a relevant bit being +1. Reliability values are determined from these bit-specific probabilities, and these reliability values are output, together with the bits, as soft bits.

12 Claims, 2 Drawing Sheets

OTHER PUBLICATIONS

Benthin, M. et al.: "Viterbi Decoding of Convolutional With Reliability Information For A Noncoherent Rake–Receiver In A CDMA–Environment", Proceedings of the Global Telecommunications Conference (Globecom), San Francisco, Nov. 28–Dec. 2, 1994, Bd. 3 of 3, 28 Nov. 1994, Institute of Electrical and Elctronics Engineers.

A.J. Viterbi, "Performance of power–controlled wideband terrestrial digital communication", IEEE Transactions on Communications, vol. 41, No. 4, Apr. 1993, p. 559 et seq.

Proakis, "Digital Communications", McGraw–Hill Int. Book Company, 1983, ISBN 0–07–Y 66490–0, Chapter 4, p. 139 et seq.

J.G. Proakis, Digital Communications, McGraw–Hill, New York, 1983, Chapter 7.5.

| i | $V_i$ | $b_0$ | $b_1$ | $P_i$ |
|---|---|---|---|---|
| 0 | 0,9 | -1 | -1 | 0,5 |
| 1 | 0,8 | -1 | 1 | 0,45 |
| 2 | 0,1 | 1 | -1 | 0,03 |
| 3 | 0,05 | 1 | 1 | 0,02 |
| 14 | 15 | 16 | | 17 |

Fig.3

METHOD FOR OBTAINING BIT-SPECIFIC RELIABILITY INFORMATION

FIELD OF THE INVENTION

The present invention relates to a method for obtaining reliability information for M-stage modulation.

BACKGROUND INFORMATION

A method for obtaining reliability information for M-stage modulation is described in A. J. Viterbi, "Performance of power-controlled wideband terrestrial digital communication", IEEE Transactions on Communications, Vol. 41, No. 4, April 1993, page 559 et seq., in the case of which, however, only one reliability information item is calculated via a symbol, that is to say via a data group, and all of the data of a data group are assessed using the same reliability information. Consequently, the information which is located in the individual bits of a data group is not evaluated completely in order to determine the distinct data. Information which is available is thus not used.

Furthermore, a mean received energy, which is split uniformly between a plurality of diversity paths, is used as the basis for the calculation of the reliability information. The individual reception paths of an actual transmission channel in general transmit different energies, however. Both the assumption of a mean total energy and the assumption of uniform distribution of this mean energy between the diversity paths normally leads to a less accurate determination of the reliability information.

SUMMARY OF THE INVENTION

The method according to the present invention has the advantage that an individual reliability information item is determined for each bit of a data group. The significance of the determined reliability information is thus advantageously enhanced.

It is particularly advantageous to use the current noise power and the instantaneous useful energy of the received signal to determine the reliability information. Consequently, it is possible to calculate the reliability information with high accuracy. The noise power and the useful energy are preferably estimated at defined time intervals.

A preferred calculation of the reliability information comprises using the specific distribution densities of the observed received signal subject to the assumptions of the M possible transmitted signals, as a result of which particularly accurate calculation of the reliability information is possible.

BRIEF DESCRIPTION OF THE DRAWINGS

FIG. 3 shows a value table for illustrating the method according to the present invention.

DETAILED DESCRIPTION

Figure 1:
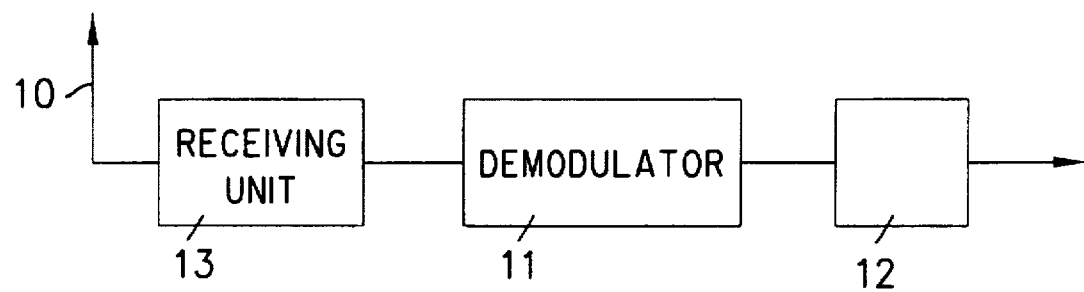
FIG. 1 shows a block diagram of an arrangement for carrying out the method according to the present invention.

FIG. 1 shows a receiving antenna 10 which is connected to the input of a receiving unit 13. An output of the receiving unit 13 is connected to an input of a demodulator 11. An output of the demodulator 11 represents memory. The signal which is received by the receiving antenna 10 is passed on to the receiving unit 13. The receiving unit 13 amplifies the received signal. Subsequently, the amplified signal is changed from the carrier frequency to an intermediate frequency, by means of frequency mixing. The frequency-shifted signal is amplified and is fed to the demodulator 11. The demodulator 11 carries out carrier demodulation and passes the demodulated signal to the computer unit 12.

Figure 2:
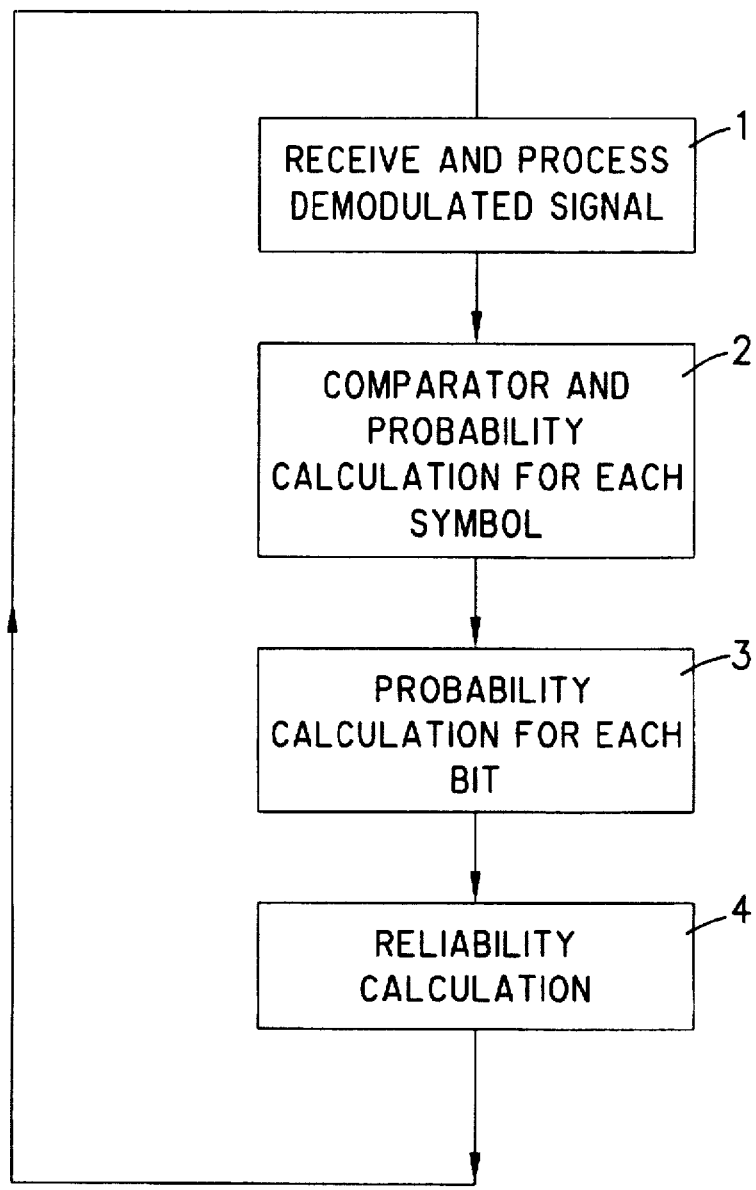
FIG. 2 shows a flow chart illustrating the method according to the present invention.

FIG. 2 shows schematically the program sequence for operation of the computer unit 12. The demodulated signal is fed to the computer unit 12 in program step 1. The demodulated signal represents a signal which has been modulated using M-stage modulation. The number M of stages is greater than or equal to 2. Each of the M signals which are used for modulation represents a symbol which represents a defined group of data bits. The M signals used for modulation are stored in the memory of the computer unit 12. The corresponding group of data bits is stored in a table, which is stored in the memory of the computer unit 12, for each of the M signals used for modulation.

In program step 2, the computer unit 12 compares the demodulated signal with the stored signals. The comparison is carried out using cross-correlation, as is described, for example, in Proakis, "Digital Communications", McGraw-Hill Int. Book Company, 1983, ISBN 0-07-Y 66490-0, Chapter 4, page 139 et seq. However, other comparison methods such as that of the adapted filter demodulator, for example, can also be used. In this way, a number M of correspondence variables $V_j$, j=0, ..., M−1, are calculated for the received, demodulated signal, which correspondence variables indicate the level of correspondence between the received, demodulated signal and the individual stored signals.

A probability value $P_j$ is calculated using the correspondence variables $V_j$, for each symbol, in accordance with the following formula:

$$P_j = \alpha Q(V_j)/q(V_j); j=0, \ldots, M-1$$

The terms $Q(V_j)$ and $q(V_j)$ represent distribution densities. They describe the probabilities of occurrence for values $V_j$ of a determined correspondence variable. The density $Q(V_j)$ includes the assumption that the j-th symbol has actually been transmitted, while, in contrast, $q(V_j)$ is based on the assumption that the current symbol is not the j-th but one of the others. On the basis of the symmetry conditions, which are in general satisfied, of the transmitted symbols (orthogonality, the same symbol energy, etc.), the formulae for the densities $Q(x)$ and $q(x)$ are themselves independent of the symbol being considered; the reference to the transmitted symbol is produced only by the argument $V_j$.

The formula definition of the densities $Q(V_j)$ and $q(V_j)$ is dependent on the receiver implementation and on the formation law which is used to determine the correspondence variables, and can differ from the described definition depending on the receiver or the formation law.

An incoherent L-path RAKE receiver having Square-Law-Combining (cf. J. G. Proakis, Digital Communications, McGraw-Hill, New York, 1983, Chapter 7.5) is considered in this exemplary embodiment. The additive channel interference is assumed to be statistically independent Gaussian interference. The distribution densities are then:

$$q(V_j) = \frac{1}{(2\sigma^2)^L(L-1)!} V_j^{L-1} e^{-\frac{V_j}{2\sigma^2}} \quad \text{symmetrical chi}^2 \text{ distribution} \quad (12)$$
$$\text{skewchi}^2\text{distribution}$$

$$Q(V_j) = \frac{1}{2\sigma^2} \left(\frac{V_j}{\rho^2}\right)^{((L-1)/2)} e^{-\frac{V_j + \rho^2}{2\sigma^2}} \cdot I_{L-1}(\rho\sqrt{V_j}/\sigma^2)$$

where $2\sigma^2$=Power of the additive channel interference (complex; equivalent low-pass representation), $\rho^2$=Total available useful energy (distributed between L paths), $I_n(x)$=Modified n-th order Bessel function of the first type, and the constant $\alpha$ is governed, independently of the selected receiver structure, by the relationship:

$$\alpha \cdot \sum_{j=0}^{M-1} Q(V_j) q(V_j) = 1$$

The noise power $2\sigma^2$ and the useful energy $\rho^2$ must be known in order to calculate the probabilities $P_j$. Both variables must be estimated continuously during operation.

In program step 3, an individual a posteriori probability is subsequently determined for each data bit of a group, and reliability information is calculated from this for each data bit. In this case, the probability values $P_j$ of the symbols for which the data bit at the v-th position in the data group corresponds with a fixed hypothesis for the data bit (for example $b_v=+1$) are added up. The sum represents, for example, an a posteriori probability $P(b_v=+1)$ in that $b_v=+1$. An a posteriori probability can be determined for the assumptions $b_v=-1$ in a corresponding manner.

This method will be explained using the table in FIG. 3. The table shows the bit groups $(b_o, b_1)$, which are assigned to the symbols, of in each case two data bits, the decision variables $V_i$ of the symbols and the probability values $P_i$ of the symbol decision.

Four different symbols are numbered successively from 0 to 3 in the first column 14 in FIG. 3, under the letter i. The decision variables (correspondence variables) having the values 0.9, 0.8, 0.1 and 0.05 are shown in the second column 15, under $V_i$. M=4 symbols are used in this exemplary embodiment, which are represented by two data bits $b_o$ and $b_1$, it being possible for each data bit to assume the value −1 or +1. The bit combinations assigned to the four symbols $S_0$, $S_1$, $S_2$, $S_3$ are shown line by line in the third column 16. The specific form of the symbols themselves is irrelevant to the current considerations; orthogonal Walsh symbols can be used, for example.

The probability values, calculated in accordance with the formula (11), of the symbols are illustrated in the last column 17, under $P_i$. It can be seen from FIG. 3 that the value −1 of the data bit $b_0$ in one case has the probability 0.5 for the symbol $S_0$ and in one case has the probability 0.45 for the symbol $S_1$. A total probability of (0.50+0.45)=0.95 thus results for the value −1 of the data bit $b_0$. A probability of 0.03 results for the symbol $S_2$ for the value 1 of the data bit $b_0$, and a probability of 0.02 for the symbol $S_3$. A total probability of (0.03+0.02)=0.05 thus results from a value +1 of the data bit $b_0$.

It can be seen from this that the data bit $b_0$ has a greater total probability for the value −1 than for the value +1. It is thus more probable that the value −1 is correct for the data bit $b_0$. If one considers the data bit $b_1$, then a probability of 0.5 results from the value −1 for the symbol $S_0$ and a probability of 0.03 for $S_2$. A total probability of (0.5+0.03) =0.53 thus results for the value −1 of the data bit $b_1$. If one considers the value +1 for the data bit $b_1$, then a probability of 0.45 results from the symbol $S_1$, and a probability of 0.02 from the symbol $S_3$. This leads to a total probability for the value +1 of the data bit $b_1$ of (0.45+0.02)=0.47.

The result of this is that the value −1 is more probable for the data bit $b_1$.

The following formula (1) shows the total probability for the value −1 of the data bit $b_0$:

$$P(b_0=-1)=P_0+P_1 \tag{1}$$

The following formula (2) shows the calculation of the total probability for the value +1 of the data bit $b_0$:

$$P(b_0=1)=P_2+P_3 \tag{2}$$

The comparison in formula (3) results in the decision that the data bit $b_0$ has the value −1:

$$P_{b0}=\max\{P(b_0=-1), P(b_0=1)\}=0.95 \rightarrow b_0=-1 \tag{3}$$

The following formula (4) indicates the calculation of the total probability for the value −1 of the data bit $b_1$:

$$P(b_1=-1)=P_0+P_2 \tag{4}$$

The following formula (5) indicates the total probability for the value +1 of the data bit $b_1$:

$$P(b_1=1)=P_1+P_3 \tag{5}$$

A comparison of formula (4) with formula (5) shows that the data bit $b_1$ having the value −1 is distinct:

$$P_{b1}=\max\{P(b_1=-1)P(b_1=1)\}=0.53 \rightarrow b_1=-1 \tag{6}$$

The associated reliability information $L_{b0}$ for the data bit $b_0$ and $L_{b1}$ for the data bit $b_1$ are calculated in accordance with:

$$L_{b0} = \log \frac{P_{b0}}{1-P_{b0}} \tag{7}$$

$$L_{b1} = \log \frac{P_{b1}}{1-P_{b1}} \tag{8}$$

Reliability information for the values −1 or +1 of the data bit $b_0$ and $b_1$ can be calculated from the total probabilities using the formula (7) and the formula (8). The reliability information is used for the purpose of making a statement relating to how probable is the decision to assign the values +1 or −1 to the data bits $b_0$ and $b_1$.

In an embodiment of the method according to the present invention, the reliability information is multiplied by the value of the data bits $b_0$ or $b_1$ in accordance with the following formulae (9) and (10):

$$\tilde{b}_0 = L_{b0} \cdot b_0 \tag{9}$$

$$\tilde{b}_1 = L_{b1} \cdot b_1 \tag{10}$$

Soft data bits $\tilde{b}_v$ v=0, . . . ,ld(M)−1 are thus calculated for each symbol interval. ld(M) designates the base 2 logarithm of the value M. Soft data bits are indicated explicitly in the following text for the soft data bit $\tilde{b}_0$ for the value −1 and the value +1.

$$P(b_0=-1) = P_0 + P_1 = 0.95 \rightarrow \overset{(-1)}{L_{b0}} = \log \frac{0.95}{1-0.95}$$

$$\overset{(-1)}{\tilde{b}_0} = \overset{(-1)}{b_0} * \overset{(-1)}{L_{b0}} = -1 * \log \frac{0.95}{1-0.95}$$

$$P(b_0 = +1) = P_2 + P_3 = 0.05 = 1 - (P_0 + P_1)$$

$$\rightarrow \overset{(+1)}{L_{b0}} = \log \frac{0.05}{1-0.05} = -\log \frac{0.95}{1-0.95}$$

$$\tilde{b}_0^{(+1)} = +1 * \left( -\log \frac{0.95}{1-0.95} \right) = \frac{(-1)}{b_0}$$

This equality applies generally for each data bit $b_v$ of the data group.

$$b_v(+1) = b_v(-1), v=0, \ldots, ld(M)-1$$

Thus, only the values of the soft data bits $\tilde{b}_u^{(+1)}$ need to be determined without any limitation of generality, in order to be able to make a decision on a statement of whether the value of the data bit $b_0$ is +1 or −1. An explicit decision for a symbol is no longer necessary or sensible, since a decision is made for each data bit of the symbol.

The reliability information and the soft data bit $\tilde{b}_u^{(+1)}$ are subsequently output in program step 4.

Finally, a jump is made to program step 1 and a new received and demodulated signal is processed.

If there is no further decoder stage in the transmission system for which the reliability information could advantageously be used, the final data bits $b_v$ are decided on firmly from the soft data bits $\tilde{b}_u$.

The term firmly decided means that a decision is made on one of two values which are predetermined in a fixed manner, for example +1 or −1. The soft data bits can also assume values not equal to +1 or −1. A decision element outputs a +1 for each data bit $b_v$ if the mathematical sign of the soft data bit $\tilde{b}_u$ is positive. If the mathematical sign of the soft data bit is negative, then the decision is that $\tilde{b}_u$ is −1.

However, the more usual case is for the output soft data bits or the reliability information to be further processed for example by a decoder in order to decide about information bits. A channel decoder or a source decoder, which is designed, for example, in the form of a Viterbi decoder, can be used as the decoder.

If the soft data bits $\tilde{b}_u$ are used to decide on information bits, the information bit is assumed to be −1 in the case of the soft data bit having a negative value, and the information bit is assumed to be +1 in the case of the soft data bit having a positive value.

The magnitude of the soft data bit is interpreted to be reliability information and is used, for example, for assessment of the path metrics during decoding using the Viterbi algorithm.

As a result of the reliability information and the soft data bits respectively being obtained and used, it is possible in the case of M-stage modulation to obtain bit-by-bit additional information (reliability information, soft data bit) during the demodulation, which additional information indicates a probability of how reliable a decision on a data bit is. Consequently, M-stage transmission methods are improved with respect to the reliability of the decision relating to "hard" data bits, that is to say data bits which can assume only predetermined values such as +1 or −1, for example.

If the additional information is included, M-stage transmission methods can be used efficiently in systems having downstream decoders. The additional information is advantageously used by subsequent signal processing units such as channel decoders or source decoders in order to improve the decision reliability.

The comparison of the received demodulated signal with the stored signals is carried out, for example, in the form of a Walsh-Hadamard-Transformation if orthogonal Walsh functions are used for M-stage modulation. A simple, incoherent receiver can be used in this way. The squares of the magnitudes of the Walsh-Hadamard-Transformations are used as decision variables.

In the case of a diversity receiver, such as a RAKE receiver or an antenna diversity, for example, which has a defined number L of transmission paths, the decision variables of the individual transmissions paths are added to form an overall decision variable $V_{gj}$. This is done, for example, using the following formula:

$$V_{gj} = \sum_{n=0}^{L-1} V_j(n), j = 0, \ldots, M-1.$$

What is claimed is:

1. A method for obtaining bit-specific reliability information during demodulation of multi-stage-modulated data transmitted via at least one modulated signal, comprising the steps of:

receiving the modulated signal and comparing the modulated signal with a plurality of stored signals, each of the modulated signal and the stored signals representing a defined group of stored data bits;

calculating a probability for each stored signal as a function of the comparison of the modulated signal with the stored signals; and determining reliability information as a function of the calculated probabilities.

2. The method according to claim 1, further comprising the step of determining a soft data bit as a function of the reliability information.

3. The method according to claim 1, wherein the probabilities are calculated for each data bit of a group.

4. The method according to claim 1, wherein the reliability information is determined as a further function of a known mean noise power and a known useful energy.

5. The method according to claim 4, further comprising the step of estimating the mean noise power and the useful energy at predetermined time intervals.

6. The method according to claim 1, wherein the probabilities $P_j$ are calculated in accordance with the following formulae:

$$P_j = \alpha * Q(V_j)/q(V_j); j=0, \ldots, M-1,$$

where $Q(V_j)$ is a first distribution density function of a determined correspondence variable $V_j$ assuming that the actually transmitted symbol is the j-th symbol and $q(V_j)$ is a second distribution density function of the determined correspondence variable $V_j$ assuming that the actually transmitted symbol is not the j-th symbol, wherein the constant $\alpha$ is obtained from the equation $$\alpha \cdot \sum_{j=0}^{M-1} Q(V_j)/q(V_j) = 1,$$

where M represents a number of stages of modulation.

7. The method according to claim 1, further comprising the step of determining a probability that a data bit $b_v$ at a v-th position in the group is one of +1 and −1, $P(b_v = +1/−1)$, as a function of a summation of the calculated probabilities in which the data bit of the stored signals at the v-th position of the group likewise represents one of +1 and −1.

8. The method according to claim 7, wherein a value of +1 is assumed for the data bit $b_v$, and further comprising the step of determining the reliability information $L_u(+1)$ in accordance with $$L_u^{(+1)} = \ln \frac{P(b_u = +1)}{P(b_v = -1)} = \ln \frac{P(b_u = +1)}{1 - P(b_u = +1)}.$$

9. The method according to claim 8, further comprising the step of determining a soft data bit $\hat{b}_u^{(+1)}$ as a function of the reliability information $L_v^{(+1)}$ in accordance with $$\hat{b}_u^{(\pm 1)} = b_u \cdot L_u^{(+1)} = \ln \frac{P(b_u = +1)}{1 - P(b_u = +1)}.$$

10. The method according to claim 7, wherein a value of −1 is assumed for the data bit $b_v$, and further comprising the step of determining the reliability information $L_u^{(-1)}$ in accordance with $$L_u^{(-1)} = \ln \frac{P(b_u = -1)}{P(b_u = +1)} = \ln \frac{P(b_u = -1)}{1 - P(b_u = -1)}.$$

11. The method according to claim 10, further comprising the step of determining a soft data bit $\hat{b}_u^{(-1)}$ in accordance with $$\hat{b}_u^{(-1)} = b_u^{(-1)} \cdot L_u^{(-1)} = \ln \frac{P(b_u = -1)}{1 - P(b_u = -1)}.$$

12. The method according to claim 2, wherein the reliability information and the soft data bit are used for channel decoding and for source decoding, respectively.

* * * * *

UNITED STATES PATENT AND TRADEMARK OFFICE
CERTIFICATE OF CORRECTION

PATENT No. : 5,790,595

DATED : August 4, 1998

INVENTOR(S): Marcus Benthin, Karl-Dirk Kammeyer

It is certified that error appears in the above-identified patent and that said Letters Patent is hereby corrected as shown below:

Front page, [75], "Hilderheim" should be --Hildesheim--;

Column 4, (formula 2), "$P_o$" should be --$P_2$--;

Column 4, (formula 9 and formula 10), " $\breve{b}$ " should be -- $\tilde{b}$ --;

Column 5, line 7, "bv (+1)= bv(-1)" should be -- $bv^{(+1)} = bv^{(-1)}$ --;

Column 7, line 9, "$L_u(+1)$" should be -- $L_u^{(+1)}$ --.

Signed and Sealed this

Fifth Day of October, 1999

*Attest:*

Q. TODD DICKINSON

*Attesting Officer*     *Acting Commissioner of Patents and Trademarks*